United States Patent

Ghosh et al.

[11] Patent Number: 6,033,131
[45] Date of Patent: *Mar. 7, 2000

[54] HYBRID SILICON-BASED MICRO-ELECTROMAGNETIC LIGHT SHUTTER

[75] Inventors: Syamal K. Ghosh, Rochester; Edward P. Furlani, Lancaster; Dilip K. Chatterjee, Rochester, all of N.Y.

[73] Assignee: Eastman Kodak Company, Rochester, N.Y.

[*] Notice: This patent is subject to a terminal disclaimer.

[21] Appl. No.: 09/164,523

[22] Filed: Sep. 30, 1998

[51] Int. Cl.⁷ .................................................. G03B 9/08
[52] U.S. Cl. .......................... 396/452; 396/457; 396/464; 396/469
[58] Field of Search ................................... 396/452, 457, 396/462, 463, 464, 469, 468

[56] References Cited

U.S. PATENT DOCUMENTS

| | | | |
|---|---|---|---|
| 3,871,012 | 3/1975 | Haraguchi | 396/454 |
| 3,987,473 | 10/1976 | Kondo | 396/464 |
| 4,333,722 | 6/1982 | Lee | 396/449 |
| 4,384,778 | 5/1983 | Lee et al. | 396/449 |
| 5,333,025 | 7/1994 | Dowe | 396/469 |
| 5,706,120 | 1/1998 | O'Brien et al. | 396/469 |
| 5,708,893 | 1/1998 | Furlani et al. | 396/464 |
| 5,783,879 | 7/1998 | Furlani et al. | 310/40 MM |
| 5,791,040 | 8/1998 | Furlani et al. | 29/607 |
| 5,881,449 | 3/1999 | Ghosh et al. | 29/602.1 |

OTHER PUBLICATIONS

U.S. application No. 08/866,991, Furlani et al., filed Jun. 2, 1997.
U.S. application No. 09/109,124, Ghosh et al., filed Jun. 30, 1998.
U.S. application No. 09/164,524, Ghosh et al., filed Sep. 30,1998.

*Primary Examiner*—Eddie C. Lee
*Attorney, Agent, or Firm*—Clyde E. Bailey, Sr.

[57] ABSTRACT

A hybrid, micro-electromagnetic light shutter includes a silicon body having a top surface with an arcuate groove formed on the top surface. A recess and a light aperture are formed in the top surface of the silicon body proximate to the arcuate groove. A shutter assemblage generally comprising metallic elements is provided with a rotatable shutter blade fixedly attached to a means for rotating. The means for rotating has a micro-magnetic element that interacts magnetically with an electromagnet for producing rotational movement. The shutter assemblage is arranged in the recess of the silicon body so that the means for rotating can be supported during rotation by the arcuate groove and be activated for rotational movement by the electromagnet.

7 Claims, 6 Drawing Sheets

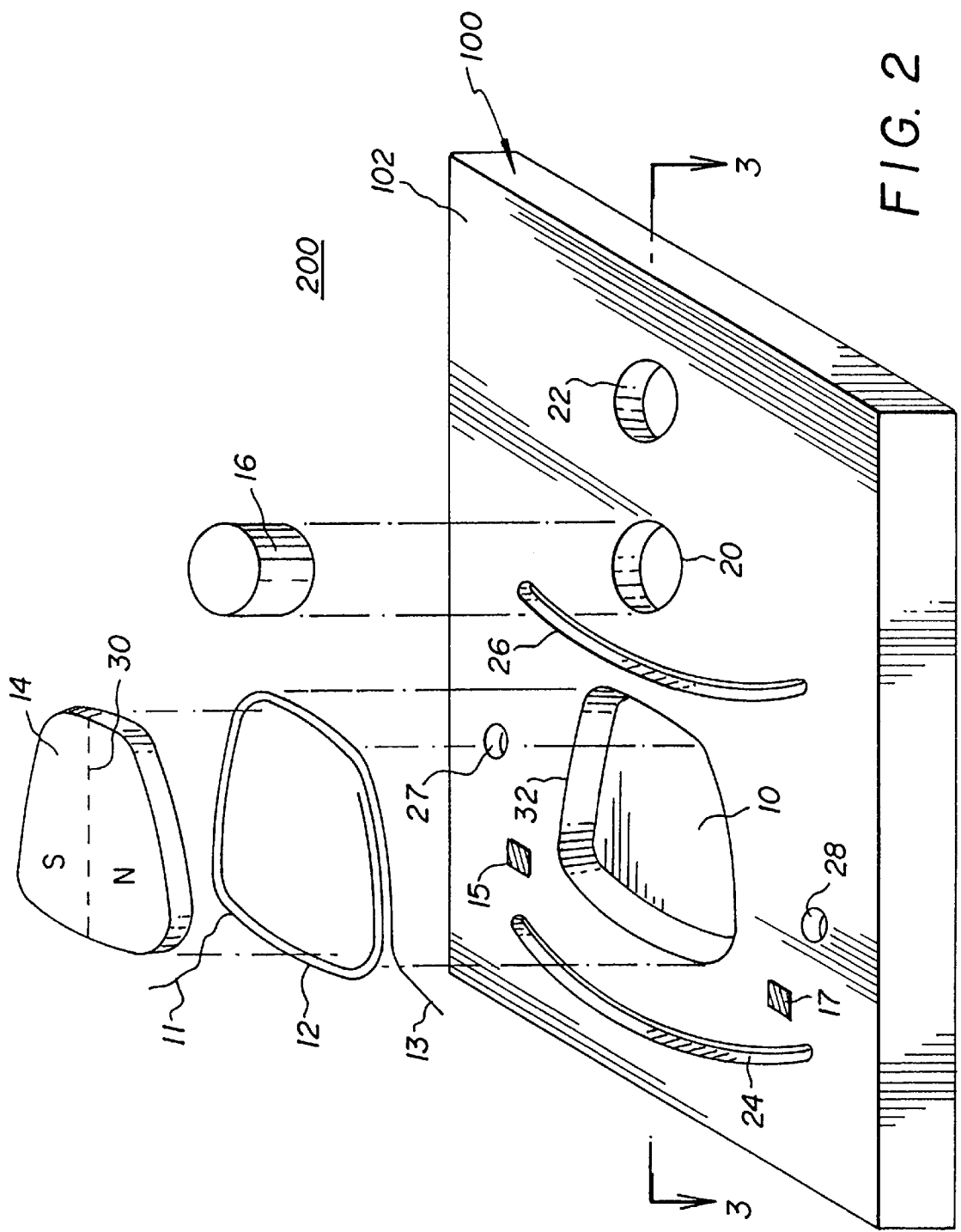

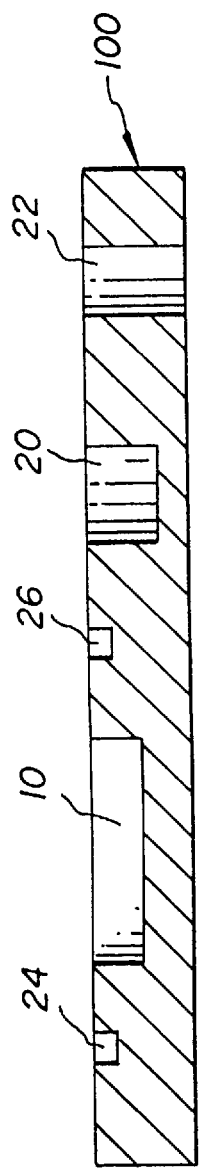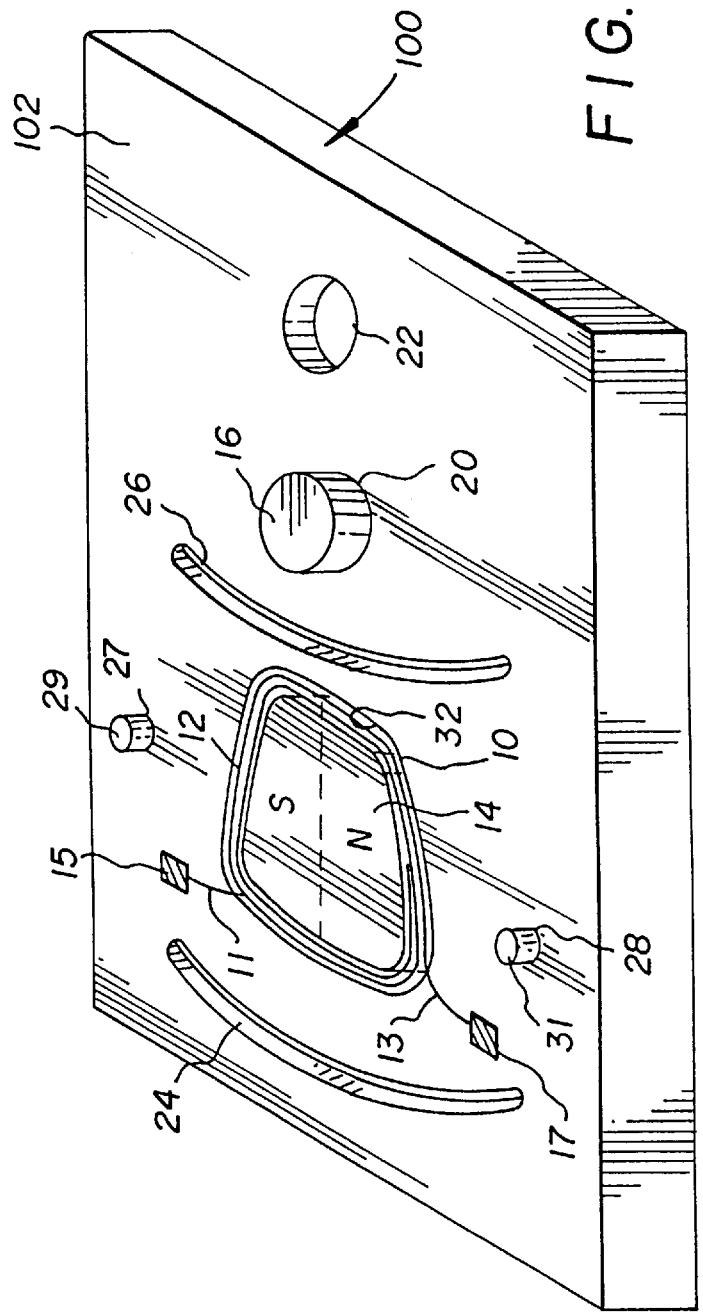

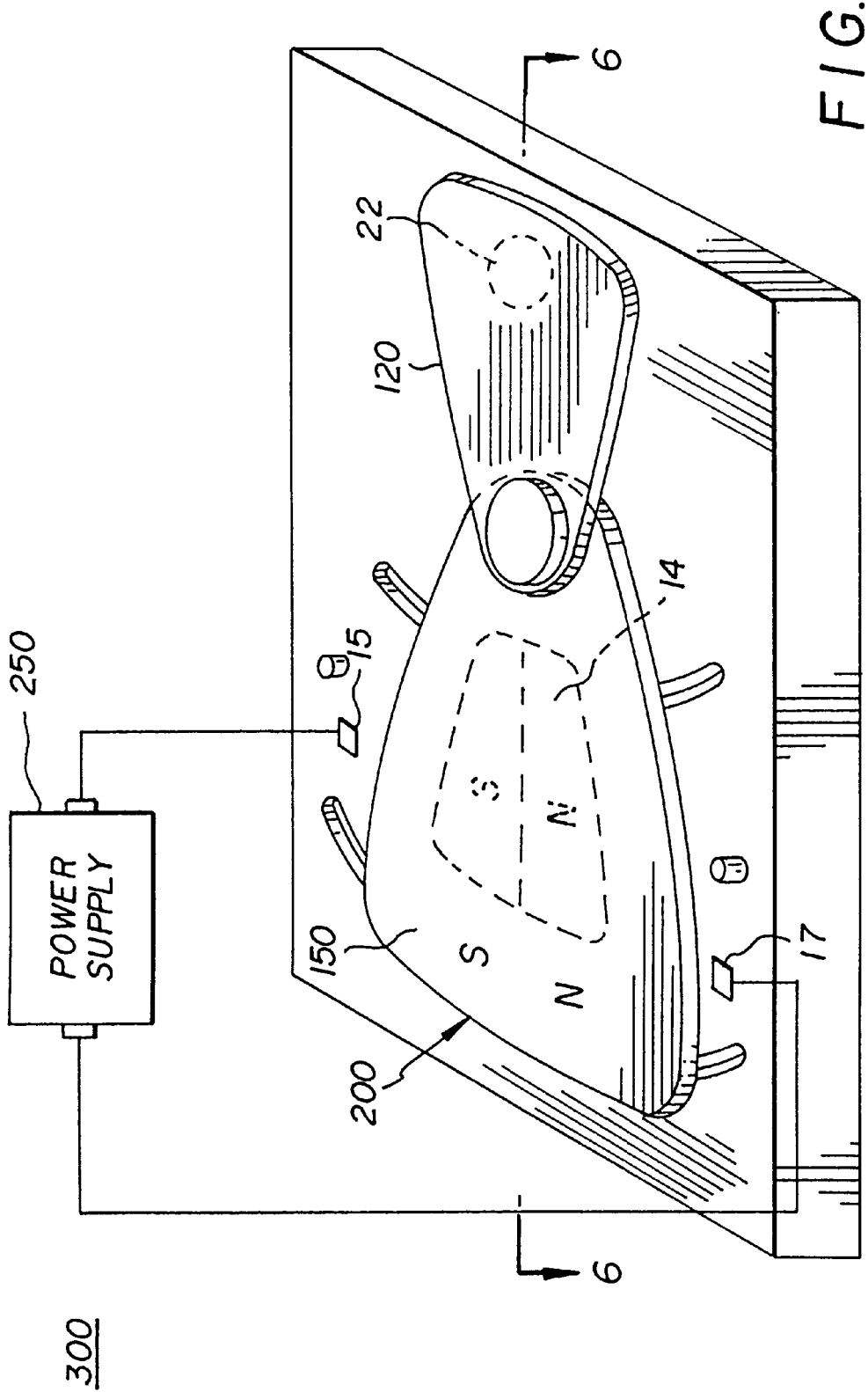

HYBRID SILICON-BASED MICRO-ELECTROMAGNETIC LIGHT SHUTTER

CROSS-REFERENCE TO RELATED APPLICATIONS

Reference is made to commonly assigned U.S. Pat. No. 5,708,893 entitled "A Micro-ceramic Electromagnetic Light Shutter" by Furlani et al., and U.S. Ser. No. 09/109,124 entitled "Method of Making Integrated Hybrid Silicon-Based Micro-actuator Devices" by Ghosh et al., and concurrently filed U.S. pat. application Ser. No. 09/164,524, entitled "Method of Making a Hybrid Micro-Electromagnetic Article of Manufacture" by Ghosh et al., the teachings of which are incorporated herein.

FIELD OF THE INVENTION

The present invention relates to electromagnetic light shutters, more particularly, the invention concerns silicon based micro-electromagnetic light shutters useable as shutters for light exposure applications.

BACKGROUND OF THE INVENTION

Electromechanical shutters are well known in the art and have been used in a number of applications, for example, in which light exposes a photosensitive surface. It is, of course, highly advantageous to miniaturize such shutters. Conventional electromechanical shutters are typically greater that 1 cubic centimeter in volume. The materials and methods for the fabrication of these devices are inadequate for the fabrication of micro-electromechanical shutters which are less than 1 cubic centimeter in volume.

Micro-Electromechanical Systems (MEMS) is a rapidly growing field that is impacting many applications today. Three-dimensional micro-engineered devices and systems involving silicon planar technology can be mass produced with features from one to a few hundred microns having tolerances in micron or sub-micron level. Most of the current micro-engineering technologies are evolved from the adaptation of thin films, photolithographic and etching technologies generally applied to silicon wafers on which silicon monoxide, silicon dioxide, silicon nitride, and the like, thin films are deposited and etched thereafter yielding planar configuration.

Although the planar silicon technology is capable of building a three-dimensional array, the process steps involved in building those structures are many and very often exceed 20 to 30 steps thus making the process less attractive for many applications. Furthermore, there are many complicated structures that are not possible to be incorporated in the silicon planar technology because of certain limitations of the thin film technology.

Moreover, experience indicates that the current planar silicon technologies using silicon substrates are inadequate for the fabrication of an integrated and self-contained three-dimensional arrays of micro-devices which can be used as solenoids, actuators, transformers, light shutters, and the like.

The limitation of the planar silicon technologies stems from the fact that the multi-step thin film technology coupled with etching processes which are usually used to build three-dimensional structures on a silicon wafer can not produce complex structures. As for example, one of the greatest drawbacks of the silicon technology is that it is not possible to build a buried helical coil or a uniform vertical cylindrical column having higher than 5:1 length to radius aspect ratio, and similar complex configurations. Furthermore, building three-dimensional multi-layered structures using thin film technology involves multiple process steps, generally twenty or more, and therefore makes this process not economically feasible.

Therefore, there persists a need for a method to fabricate integrated hybrid silicon-based micro devices which require fewer process steps thereby reducing production cycle time and increasing cost efficiency.

SUMMARY OF THE INVENTION

It is, therefore, an object of the present invention to provide a miniaturized light shutter formed in a silicon body.

Another object of the invention is to provide a light shutter that has electromagnetically induced rotational movement.

Yet another object of the invention is to provide a light shutter that has a shutter blade assemblage made from light metals or plastics.

It is a feature of the light shutter of the invention that a micro-electromagnet is seated in a recess formed in the silicon body for producing rotational movement of a micro-magnetic member having a shutter blade rigidly fixed thereto.

To accomplish the above objects and features of the invention, there is provided, in one aspect of the invention, a hybrid micro-electromagnetic light shutter, comprising:

(a) a silicon body having a top surface, a generally arcuate etched groove arranged on said top surface, a recess portion arranged in said top surface proximate to said groove, and a light aperture passing through said silicon body and arranged proximate to said recess portion; and, (b) a shutter assemblage arranged in said recess of said silicon body, said shutter assemblage comprising a rotatable shutter blade and means supportable by said groove for rotating the rotatable shutter blade from a first, light blocking position blocking said light aperture from light to a second light passing position exposing said light aperture to light.

In another aspect of the invention, there is provided a hybrid micro-electromagnetic light shutter, comprising:

(a) a silicon body having a top surface, first and second spaced apart etched arcuate grooves arranged on said top surface, a first recess arranged in said top surface between said first and second grooves, a second recess arranged in said top surface proximate to said second arcuate groove and a light aperture passing through said silicon body and arranged proximate to said second recess;

(b) a ferromagnetic member having a conductive coil wrapped at least partially therearound forming an electromagnet is arranged in said first recess of said silicon body;

(c) a shutter assemblage comprising a rotatable shutter blade and means for rotating said shutter blade, said shutter blade being rigidly fixed to said means for rotating, and wherein said means for rotating comprises a micro-magnet fixed spaced apart from said electromagnet for producing rotational movement of said shutter assemblage in response to a voltage applied to said electromagnet.

Thus, hybrid micro-magnetic light shutters of the present invention have numerous advantages over prior developments. One such advantage is that they can be made in high volume with high yields at reduced cost using an automated production process. Another important advantage of this invention is that other micro-molding technologies can be integrated to build these devices to form a silicon-based hybrid device.

BRIEF DESCRIPTION OF THE DRAWINGS

The foregoing as well as other objects, features and advantages of this invention will become more apparent from the appended Figures, wherein like reference numerals denote like elements, and wherein:

FIG. 2 is a perspective of a silicon body, with etched recesses which forms the base element of a micro-electromagnetic light shutter;

FIG. 3 is a cross-sectional view of the etched silicon body taken along 3—3 of FIG. 2;

FIG. 4 is a perspective of the silicon body with the inserted micro-molded components;

FIG. 5 is a perspective of the assembled hybrid electromagnetic light shutter mechanism;

DETAILED DESCRIPTION OF THE INVENTION

Figure 1:
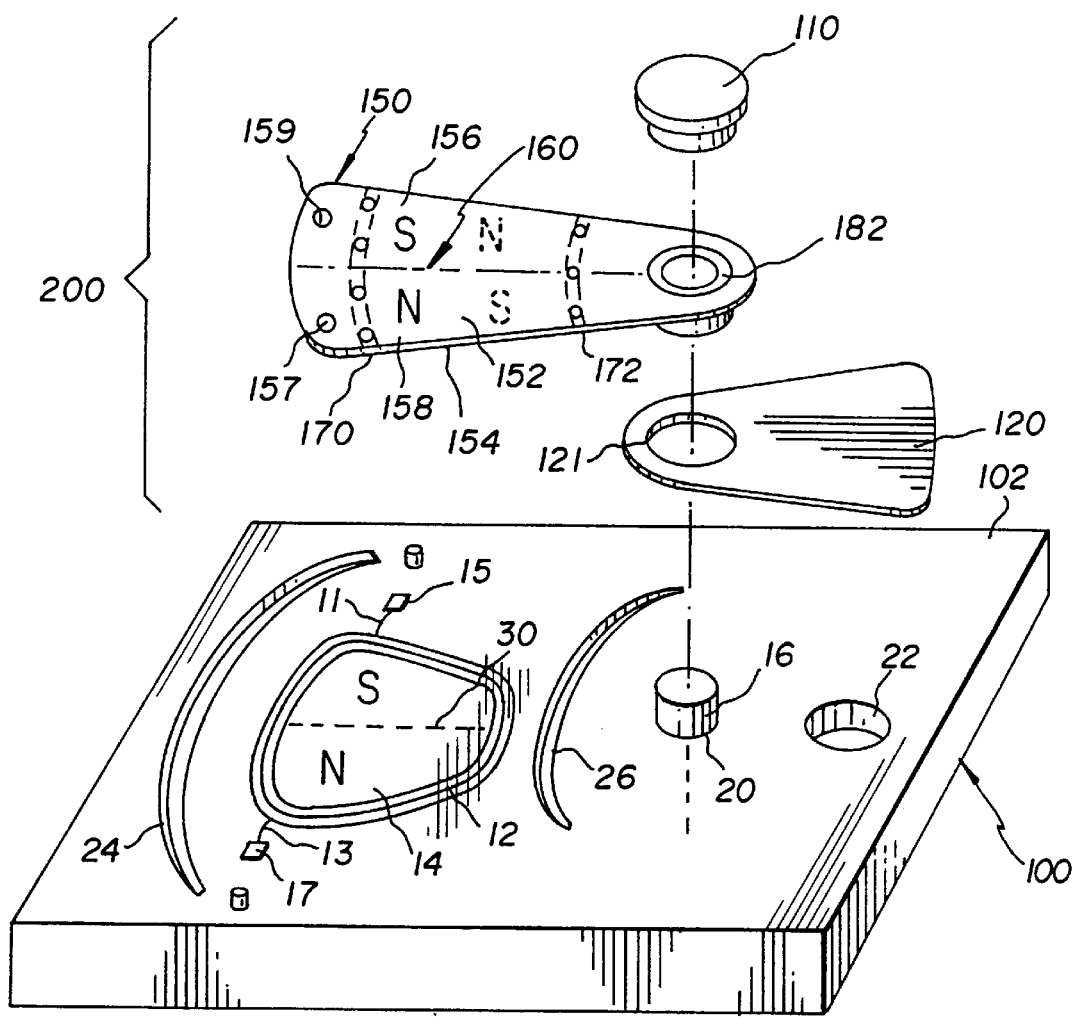
FIG. 1 is an exploded view of the assembly of the micro-electromagnetic light shutter in accordance with the present invention.

Referring to FIG. 1, an exploded perspective is shown of the micro-electromagnetic light shutter assembly 200 on the silicon body 100, depicting how its components are assembled as a hybrid unit in the silicon substrate 100. The shutter assembly 200 comprises a low coefficient of friction shaft 16 (made from plastics like Vespel™, nylon or teflon, or teflon coated steel or aluminum), a top plug 110, a shutter blade 120 and a micro-magnet 150. The shutter blade 120 can be constructed using light metals such as Al, Mg, or Al-alloys or alternatively, opaque plastics such as nylon or polyethylene or PVC. Micro-magnet 150 is made from a hard magnetic material such as neodynium-iron-boron (NdFeB). It has a top surface 152 and a bottom surface 154 and is polarized perpendicularly to these surfaces with south and north surface poles 156 and 158, respectively, on its top surface 152 adjacent to one another along centerline 160 which is shown as a dashed line. The bottom surface 154 will have corresponding south and north surface poles, 157 and 159 beneath poles 158 and 156 of the micro-magnet 200 shutter mechanism as illustrated. Specifically, conductive pads 15 and 17 are shown, and a permanent magnet 14 is shown inserted into recess 10 (shown clearly in FIG. 2). The micro-magnet 150 is also provided with arc grooves 170 and 172 corresponding to arc grooves 24, 26, respectively. Steel or plastic balls 180 (see FIG. 6) are pressed into the grooves 170, 172 so that they can easily and effortlessly ride on the bearing grooves 24, 26 respectively, on the top surface 102 of the silicon body 100. A plain sleeve bearing 182 comprising a plastic having low coefficient of friction is bonded or press fitted onto the micro-magnet 150. The sleeve bearing portion 182 of the micro-magnet 150 is inserted through a hole 121 provided in the shutter 120 and rides on the shaft 16. The shutter assembly 200 is secured on the shaft by press fitting the top plug 110 on the shaft 16.

Referring to FIG. 2, the conductive coil 12 is placed inside the first recess 10 along its side wall 32 so that it is flush with the top surface 102 of the silicon body 100. The first and second leads 11, 13 of the conductive coil 12 are soldered onto the conductive pads 15, 17 respectively, for electrical connection to the power supply 250 (see FIG. 5). The micro-molded permanent magnet 14, a ferromagnetic element, is made from hard magnetic materials, such as NdFeB, barium ferrite, and SmCo which can be produced using injection molding process.

Alternatively, the ferromagnetic element 14 can be made from a soft-magnetic material such as permalloy, supermalloy, sendust, iron, nickel, or nickel-iron alloys thereof. The permanent magnet 14 is polarized with north and south surface poles which are adjacent to one another along the centerline 30 as shown. The details of the preferred method of forming micro-magnets are described in the commonly assigned U.S. Pat. No. 5,888,445, Mar. 30, 1999, entitled "Method for Making Ceramic Micro-Electromechanical Parts and Tools," by Furlani et al., and commonly assigned U.S. Pat. No. 5,791,040 Aug. 11, 1998, entitled "Method For Making Ceramic Tools For The Production Of Micro-Magnets," by Furlani et al., both hereby incorporated herein by reference. Also shown in FIG. 2 are two conductive pads 15,17 comprising silver, gold, or aluminum formed by sputtering or thermal evaporation process generally known to the artisans.

Referring again to FIG. 2, a perspective is illustrated of a silicon body 100 having a top surface 102, comprising a first etched recess 10 for receiving a conductive coil 12 having first and second leads 11, 13, a micro-molded permanent magnet 14, a second etched recess 20 for receiving a shaft 16 for a shutter assembly, a light aperture 22, arc grooves 24, 26 and two circular recesses 27, 28 for receiving shutter stops.

Referring to FIG. 3, a cross-sectional view taken along a line 3—3 of FIG. 2 of the silicon substrate 100 is shown illustrating the location of the recesses 10, 20 arc grooves 24, 26 and the light aperture (through hole) 22.

Referring to FIG. 4, a perspectives is illustrated of the silicon substrate 100 having inserted therein the micro-molded permanent magnet 14, conductive coil 12, the shaft 16 for the shutter assembly, and the two shutter stops 29, 31. Preferably, any free space between the conductive coil 12 and the side wall 32 of the recess 10 (shown more clearly in FIG. 2) is filled with a thin layer of electrically insulating epoxy to bond the conductive coil 12 to the recess 10. The micro-molded permanent magnet 14 is bonded to the bottom surface of the recess 10. Similarly, the shaft 16 is held in position in the recess 20 by epoxy bonding. The shutter stops 29, 31 can be placed inside the respective grooves 27, 28 by press fitting or bonding with epoxy or similar bonding agent. Next, the first and second leads II, 13 of the conductive coil 12 are soldered on to the conductive pads 15, 17 respectively, on the silicon body top surface 102 to make an ohmic electrical connection. It must be understood that shutter stops 29, 31 are not necessary, but are provided as a precautionary measure to restrict the movement of the micro-magnet 150. The arc grooves 24, 26 provide the ease of movement as well as the extent of movement of the micro-magnet 150.

Referring to FIG. 5, a perspective is shown of the assembled micro-electromagnetic light shutter drive 300 with ferromagnetic element 14, shutter aperture 22, power supply 250, and shutter assembly 200 (see FIG. 1). Power supply 250 is electrically connected to conductive pads 15 and 17 so as to provide current to the conductive coil 12 for causing rotation of micro-magnet 150 and hence shutter blade 120 as will be described below.

Figure 6:
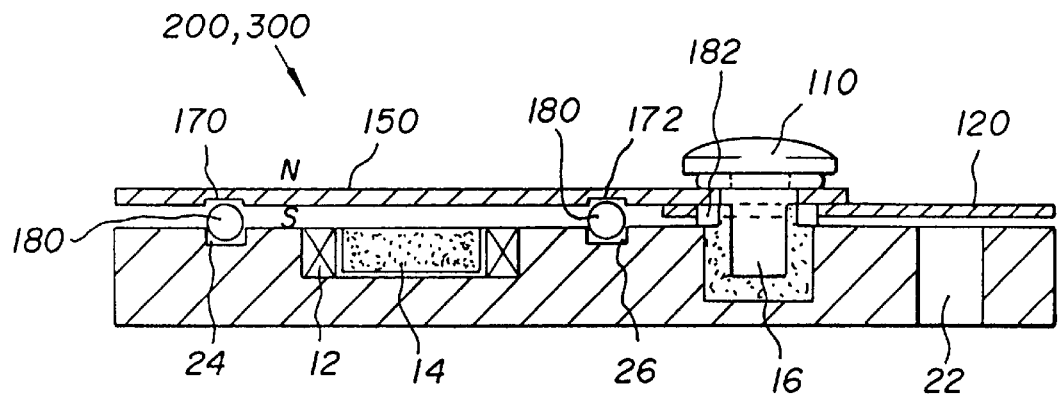
FIG. 6 is a cross-sectional view of the assembled hybrid micro-electromagnetic light shutter taken along line 6—6 of FIG. 5.

Referring to FIG. 6, assembled light shutter drive 300 and shutter assembly 200 are shown in a cross-sectional view taken along line 6—6 of FIG. 5. Shutter assembly 200 comprises a low friction plastic sleeve bearing 182 provided in rotational relationship with the shaft 16, a top plug 10, a shutter blade 120, and a micro-magnet bottom surface 154 (as shown clearly in FIG. 1). The micro-magnet 150 is fixedly attached to the shutter blade 120 such that rotation of the micro-magnet 150 causes the shutter blade 120 to rotate by the same degree. A plurality of balls 180 are attached to the micro-magnet 150 to facilitate easy rotation of the shutter assembly 200 along the etched grooves 24, 26 on the silicon body top surface 102.

Figure 7:
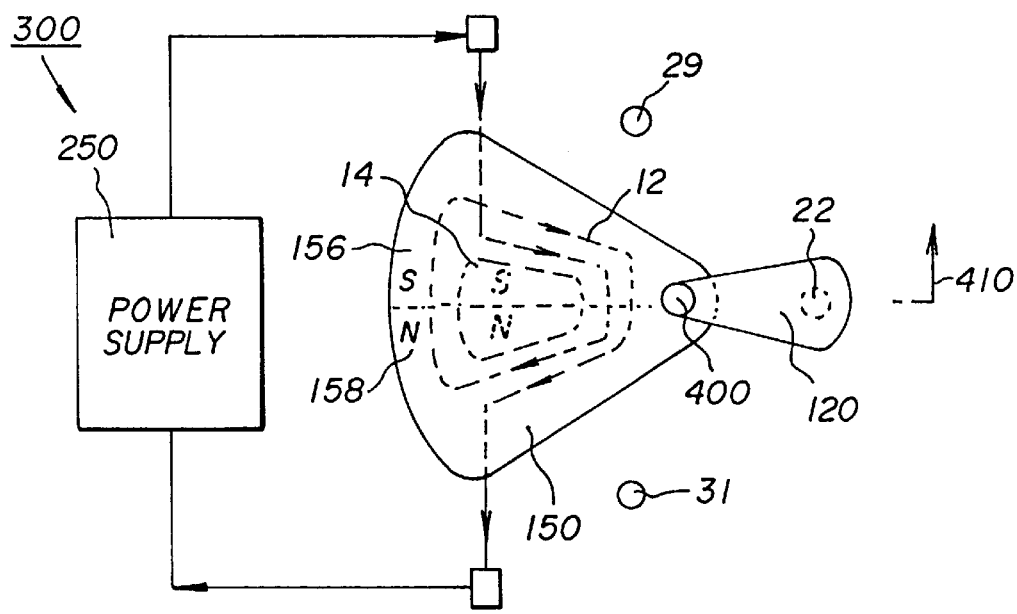
FIGS. 7 and 8 are schematic diagrams depicting rotational movements of the shutter member.
Figure 8:
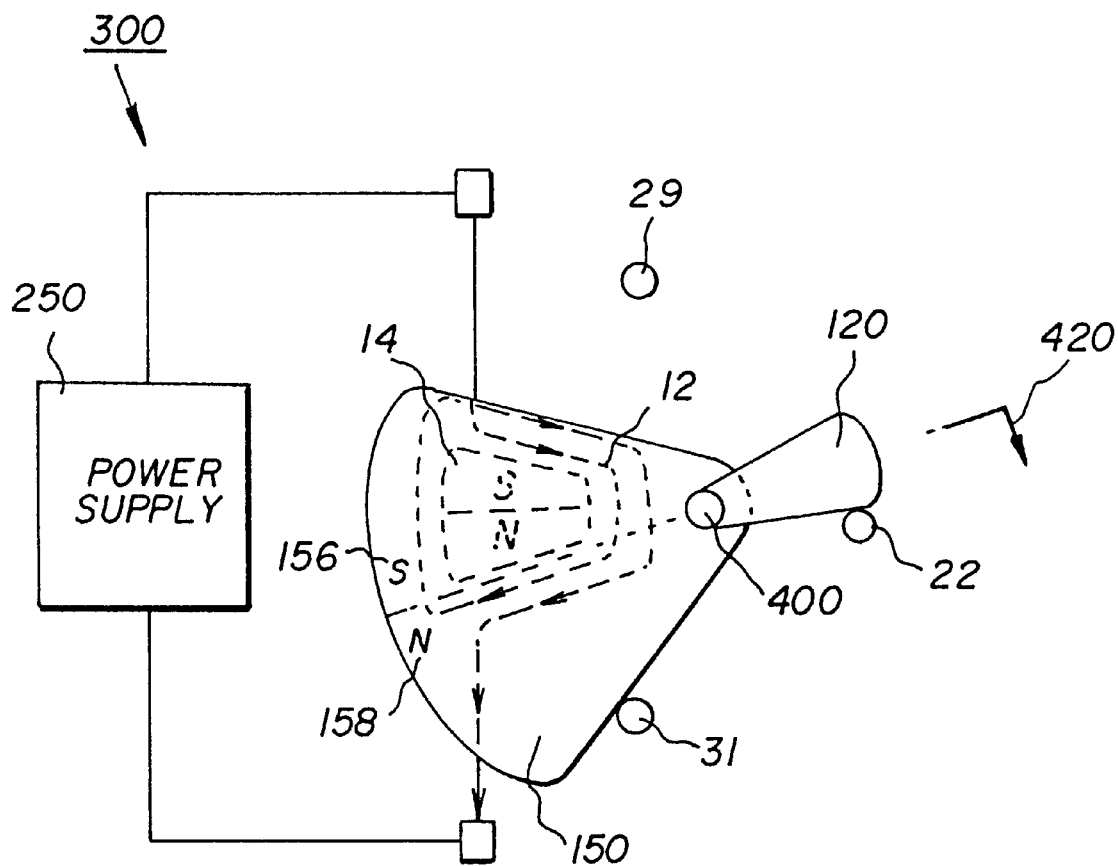

Referring to FIGS. 7 and 8, schematic diagrams are shown depicting the operation of assembled light shutter drive 300. In FIG. 7, shutter blade 120, which is fixedly attached to rotatable micro-magnet 150, is in a first, light blocking position preventing light from passing through aperture 22. The shutter blade 120 is held in the light blocking position because of the attraction of micro-magnet 150 to permanent magnet 14. Specifically, the south and north poles 157 and 159, respectively, on the bottom surface of micro-magnet 150 (see FIG. 1) have respective attractive forces to north and south surface poles of ferromagnetic element (permanent magnet) 14. It is instructive to note that if ferromagnetic element 14 is made from a soft-magnetic material the micro-magnet 150 will be attracted to, and center itself with respect to, ferromagnetic element 14, thereby holding the shutter blade in the light blocking position. To unblock (uncover) aperture 22, a drive voltage is applied from the power supply 250 to conductive coil 12 causing current to flow in a first direction through the conductive coil 12 (as indicated by the arrows on dashed lines) which is beneath micro-magnet 150. The magnetic field from the energized conductive coil 12 imparts a torque to micro-magnet 150 causing it to rotate counterclockwise about pivot point 400 as indicated by arrow 410, as is well known. Specifically, the torque imparted to micro-magnet 150 is due to the Lorentz force of energized conductive coil 12 on the south and north poles 157 and 159 on the micro-magnet bottom surface 154. Skilled artisans will appreciate that this Lorenz force is more dominant than the corresponding Lorentz force on the south and north poles 156 and 158 on the micro-magnet top surface 152. It is instructive to note that the current through the conductive coil 12 must be of sufficient magnitude so that the torque imparted by energized conductive coil 12 to micro-magnet 150 overcomes the holding torque imparted to micro-magnet 150 by ferromagnetic element 14. The micro-magnet 150 rotates until it impacts stop structure (shutter stop) 29, 31 or restricted by the extreme ends of the grooves 24, 26. In FIG. 8 the shutter blade 120 is shown in a second, light passing position in which aperture 22 is uncovered thereby allowing light to pass therethrough. The shutter blade 120 is held in this position as long as the power supply 250 supplies a sufficient current to coil 12 as noted above. Once the current is discontinued, the shutter blade 120 will rotate clockwise back to the position shown in FIG. 7 as indicated by arrow 420. This rotation is due to the torque imparted to micro-magnet 150 by the ferromagnetic element 14 as described above.

The invention has been described in detail with particular reference to certain preferred embodiments thereof, but it will be understood that variations and modifications can be effected within the spirit and scope of the invention.

PARTS LIST 10 recess
11 first lead
12 conductive coil
13 second lead
14 permanent magnet/ferromagnetic element
15 conductive pad
16 shaft
17 conductive pad
20 recess
22 light aperture (through-hole)
24 arc groove
26 arc groove
27 recess
28 recess
29 shutter stop
30 centerline
31 shutter stop
32 recess side wall
100 silicon body
102 silicon body top surface
110 top plug
120 shutter blade
121 through-hole
150 micro-magnet
152 micro-magnet top surface
154 micro-magnet bottom surface
156 surface south pole
157 beneath south pole
158 surface north pole
159 beneath north pole Parts List continued 160 centerline
170 groove
172 groove
180 ball
182 sleeve bearing
200 shutter assembly
250 power supply
300 shutter drive mechanism
400 pivot
410 arrow
420 arrow

What is claimed is:

1. A hybrid micro-electromagnetic light shutter, comprising:

(a) a silicon body having a top surface, a generally arcuate etched groove arranged on said top surface, a recess portion arranged in said top surface proximate to said groove, and a light aperture passing through said silicon body and arranged proximate to said recess portion; and, (b) a shutter assemblage arranged on said top surface of said silicon body and rotatable along said groove, said shutter assemblage comprising a rotatable shutter blade and a rotatable micro-magnet cooperatively connected to said shutter blade for producing corresponding rotating movements of the rotatable shutter blade from a first, light blocking position blocking said light aperture from light to a second light passing position exposing said light aperture to light; and, (c) a ferromagnetic member bonded to said recess of said silicon body proximate to rotatable movements of said rotatable micro-magnet cooperatively connected to said shutter blade, said ferromagnetic member having a conductive coil wrapped at least partially therearound forming a micro-electromagnet for selectively enabling said shutter blade to be held in said first, light blocking position and, upon applying a current to said conductive coil enabling said shutter blade advance to said light passing position unblocking said light aperture.

2. The hybrid silicon-based micro-electromagnetic light shutter recited in claim 1 wherein the shutter blade is made from light materials selected from the group consisting of:
   (a) aluminum;
   (b) aluminum-alloys;
   (c) opaque plastics;
   (d) polyethylene;
   (e) polyvinyl chloride; and, (f) a mixture thereof.

3. A hybrid micro-electromagnetic light shutter, comprising:
   (a) a silicon body having a top surface, first and second spaced apart etched arcuate grooves arranged on said top surface, a first recess arranged in said top surface between said first and second grooves, a second recess arranged in said top surface proximate to said second arcuate groove and a light aperture passing through said silicon body and arranged proximate to said second recess;
   (b) a ferromagnetic member having a conductive coil wrapped at least partially therearound forming an electromagnet is arranged in said first recess of said silicon body;
   (c) a shutter assemblage comprising a rotatable shutter blade and means for rotating said shutter blade, said shutter blade being rigidly fixed to said means for rotating, and wherein said means for rotating comprises a micro-magnet fixed spaced apart from said electromagnet for producing rotational movement of said shutter assemblage in response to a voltage applied to said electromagnet.

4. The hybrid micro- electromagnetic light shutter recited in claim 3 wherein means is provided to limit rotational movement of said micro-magnet along said first and second grooves, said means to limit comprising a stop structure arranged on said top surface of said silicon body opposite either end of one of said first and second accurate grooves supporting rotation of said micro-magnet.

5. The hybrid micro-electromagnetic light shutter recited in claim 3 further comprising a sleeve bearing supporting said shutter assemblage, said sleeve bearing being made from a low friction plastic material.

6. The hybrid micro-electromagnetic light shutter recited in claim 5 wherein said low friction plastic material is selected from the group consisting of:
   (a) teflon;
   (b) teflon impregnated polyimideimide;
   (c) graphite impregnated polyimideimide; and,
   (d) a mixture thereof.

7. The hybrid silicon-based micro-electromagnetic light shutter recited in claim 3 wherein the shutter blade is made from light metals selected from the group consisting of:
   (a) aluminum;
   (b) aluminum-alloys;
   (c) opaque plastics;
   (d) polyethylene;
   (e) polyvinyl chloride; and,
   (f) a mixture thereof.

* * * * *